(12) United States Patent
Kim

(10) Patent No.: US 8,850,510 B2
(45) Date of Patent: *Sep. 30, 2014

(54) DIGITAL BROADCAST RECEIVER AND UPGRADING METHOD THEREOF

(75) Inventor: Yang-soo Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 224 days.

This patent is subject to a terminal disclaimer.

(21) Appl. No.: 13/279,802

(22) Filed: Oct. 24, 2011

(65) Prior Publication Data

US 2012/0038824 A1 Feb. 16, 2012

Related U.S. Application Data

(62) Division of application No. 10/934,469, filed on Sep. 7, 2004, now Pat. No. 8,046,816.

(30) Foreign Application Priority Data

Nov. 18, 2003 (KR) .................................. 2003-81544

(51) Int. Cl.
| | |
|---|---|
| H04N 7/16 | (2011.01) |
| H04N 21/442 | (2011.01) |
| H04L 29/08 | (2006.01) |
| G06F 9/445 | (2006.01) |
| H04N 21/433 | (2011.01) |
| H04N 5/44 | (2011.01) |
| H04N 21/434 | (2011.01) |
| H04N 21/458 | (2011.01) |

(52) U.S. Cl.
CPC .......... *H04N 21/433* (2013.01); *H04N 21/4424* (2013.01); *H04L 67/34* (2013.01); *H04N 7/163* (2013.01); *G06F 8/65* (2013.01); *H04N 5/4401* (2013.01); *H04L 69/329* (2013.01); *H04N 21/4348* (2013.01); *H04N 21/4586* (2013.01)

USPC ............. 725/152; 725/86; 725/114; 725/132; 725/139

(58) Field of Classification Search
USPC ............ 348/342, 473, 723; 725/86, 114, 152, 725/132, 139
See application file for complete search history.

(56) References Cited

U.S. PATENT DOCUMENTS

2002/0120885 A1* 8/2002 Choi et al. ...................... 714/38

FOREIGN PATENT DOCUMENTS

| | | |
|---|---|---|
| JP | 11-004451 | 1/1999 |
| JP | 11-055581 | 2/1999 |
| JP | 2000-115650 | 4/2000 |
| KR | 1002532290000 | 1/2000 |

OTHER PUBLICATIONS

KR Office Action issued on Aug. 22, 2005 for KR Patent Application No. 2003-81544.

\* cited by examiner

*Primary Examiner* — Jivka Rabovianski
(74) *Attorney, Agent, or Firm* — Stanzione & Kim, LLP

(57) ABSTRACT

A digital broadcast receiver and an upgrading method thereof that can achieve an upgrade stabilization. The digital broadcast receiver includes a tuner to receive broadcast data of a selected channel, a demultiplexer to separate new middleware data and information data corresponding to the new middleware data from the broadcast data, a memory to pre-store previous middleware data and to store the new middleware data and the information data, and a controller to determine whether to store the new middleware data in the memory based on the information data. If storage of the new middleware data is completed, the controller checks whether an upgrade is successful by executing the new middleware data, and if the upgrade fails, the controller executes the previous middleware data pre-stored in the memory. Thus, the receiver upgrades the received middleware program in a stable manner.

14 Claims, 2 Drawing Sheets

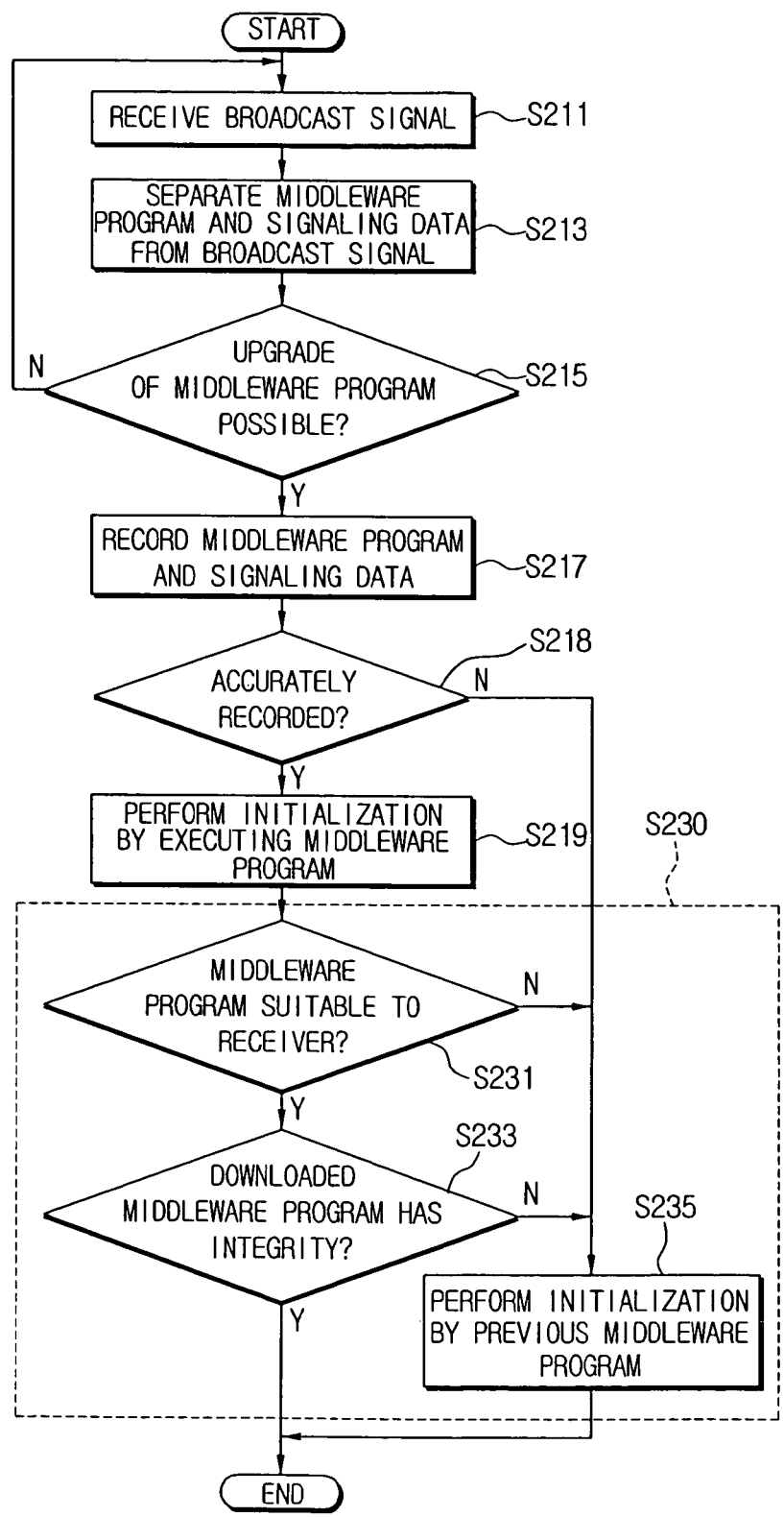

DIGITAL BROADCAST RECEIVER AND UPGRADING METHOD THEREOF

CROSS-REFERENCE TO RELATED APPLICATIONS

This application is a divisional application of U.S. patent application Ser. No. 10/934,469 filed Sep. 7, 2004, now U.S. Pat. No. 8,046,816, which claims the benefit of Korean Patent Application No. 10-2003-0081544, filed on Nov. 18, 2003, in the Korean Intellectual Property Office, the disclosures of which are incorporated herein in their entirety by reference.

BACKGROUND OF THE INVENTION

1. Field of the Invention

The present general inventive concept relates to a digital broadcast receiver, and more particularly, to a digital broadcast receiver and an upgrading method thereof that can achieve stable upgrades.

2. Description of the Related Art

A conventional upgrading method for a digital broadcast receiver is to separate upgrade data from a received broadcast signal and then confirm whether the separated upgrade data corresponds to the receiver by analyzing information in the separated upgrade data. If it is confirmed that the separated upgrade data corresponds to the receiver, then the upgrade is performed. Specifically, the conventional upgrading method performs the upgrade in a manner that removes the existing system software on the receiver, and stores the received data in a flash memory.

The conventional upgrading method for a digital broadcast receiver as described above can add a new operation or receive a new service.

However, the conventional upgrading method upgrades the system software on the assumption that the received upgrade data was downloaded intact and is compatible with the receiving unit. Accordingly, the conventional upgrading method cannot handle problems that may be produced in a situation where there is a lack of integrity of the received upgrade data, the receiving hardware is incompatible with the upgrade data, or the receiving hardware is inoperable.

SUMMARY OF THE INVENTION

The present general inventive concept has been developed in order to solve the above drawbacks and other problems associated with the conventional arrangement. An aspect of the present general inventive concept is to provide a digital broadcast receiver and an upgrading method thereof that can achieve stable upgrades.

Additional aspects and advantages of the present general inventive concept will be set forth in part in the description which follows and, in part, will be obvious from the description, or may be learned by practice of the present general inventive concept.

The foregoing and/or other aspects and advantages of the present general inventive concept are achieved by providing a digital broadcast receiver including a tuner to receive broadcast data of a selected channel comprising new middleware data and information data corresponding to the new middleware data, a demultiplexer to separate new middleware data and information data from the broadcast data, a memory to pre-store previous middleware data and storing the new middleware data and the information data, and a controller to determine whether to store the new middleware data in the memory based on the information data, wherein if the controller stores the new middleware data, and when storage of the new middleware data is completed, the controller checks whether an upgrade is successful by executing the new middleware data, and if the upgrade fails, the controller executes the previous middleware data pre-stored in the memory.

The controller can check whether the upgrade is successful by determining whether the new middleware data is suitable to the receiver by checking the information data stored in the flash memory through a check routine of the information data in the new middleware data. The information data is receiver information that can include information on a manufacturer, a model and a version of the receiver.

The controller can check whether the upgrade is successful by determining whether any of the downloaded new middleware data is lost using the information data and actual information of the downloaded new middleware data. The information data is data information that includes a name and a size of the downloaded new middleware data.

The digital broadcast receiver can further include a temporary memory to download the new middleware data, and the controller can determine whether the upgrade is successful by checking whether the downloaded new middleware data is accurately recorded in the memory.

If a power supply of the receiver is turned off while the controller checks whether the upgrade is successful, the controller would typically determine that the upgrade fails, and the controller can then generate a guide screen that can output a result of checking whether the upgrade has been successful.

In another aspect of the present general inventive concept, there is provided an upgrading method of a digital broadcast receiver which includes the operations of receiving broadcast data of a selected channel, separating new middleware data and information data corresponding to the new middleware data from the broadcast data, storing the new middleware data and the information data in a memory based on the information data, if storage of the new middleware data is completed, checking whether an upgrade is successful by executing the new middleware data, and if the upgrade fails, executing previous middleware data pre-stored in the memory.

The operation of checking whether the upgrade is successful further determines whether the new middleware data is compatible with the receiver by checking the information data stored in the flash memory through a check routine of the information data in the new middleware data. The operation of checking can also determine whether the new middleware data was downloaded intact using the information data and actual information of the downloaded new middleware data.

Accordingly, the digital broadcast receiver can receive stable downloads by checking whether the upgrade is successful after the digital broadcast receiver performs the upgrade, and by using the upgrade data of the previous version if the upgrade fails.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 2 is a flowchart illustrating an upgrading process according to another embodiment of the present general inventive concept, performed by a digital broadcast receiver according to the present general inventive concept.

DETAILED DESCRIPTION OF THE PREFERRED EMBODIMENTS

Figure 1:
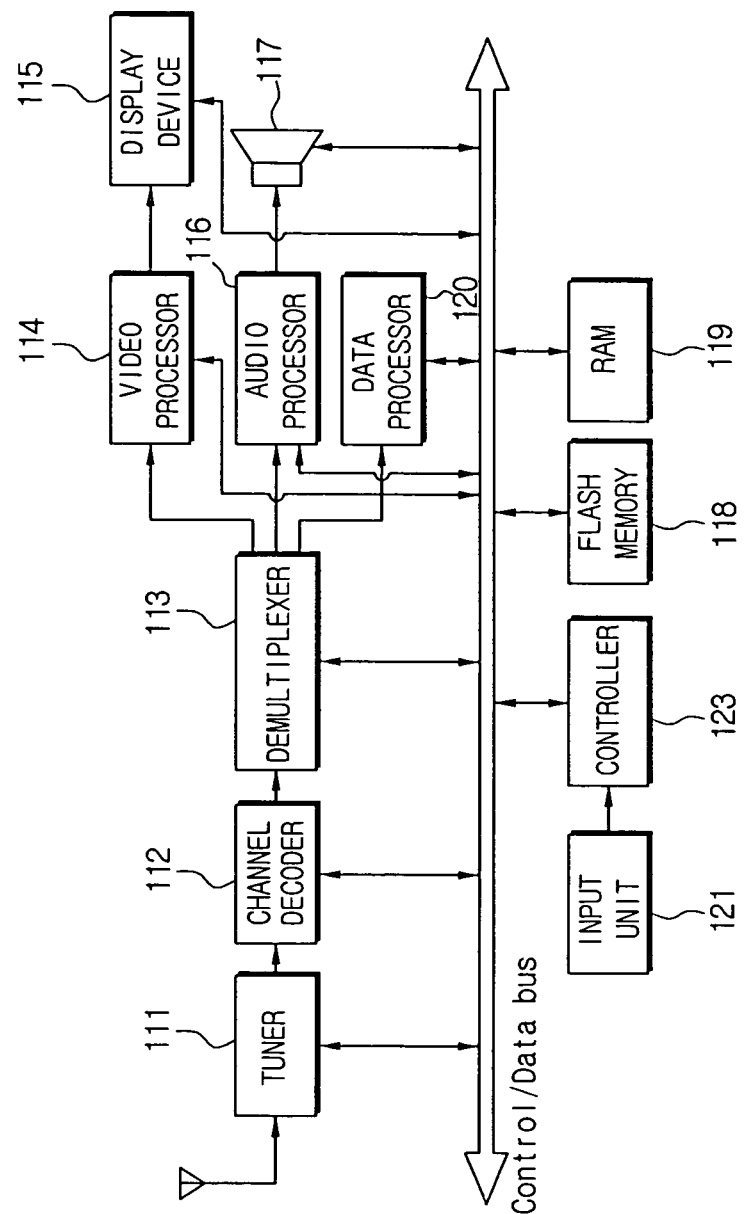
FIG. 1 is a schematic block diagram of a digital broadcast receiver according an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram of a digital broadcast receiver according an embodiment of the present general inventive concept.

Referring to FIG. 1, the digital broadcast receiver includes a tuner 111, a channel decoder 112, a demultiplexer 113, a video processor 114, a display device 115, an audio processor 116, a speaker 117, a data processor 120, a flash memory 118, a RAM 119, an input unit 121, and a controller 123.

The tuner 111 selects a channel, and receives a broadcast signal of the selected channel. The broadcast signal includes diverse additional data in addition to the broadcast data. The channel decoder 112 demodulates and decodes the received broadcast signal corresponding to the modulation and coding method of a transmitter side.

The demultiplexer 113 separates the channel-decoded broadcast signal into video data, audio data and additional data. The additional data has diverse service data and information data corresponding to the service data. Middleware data is provided to a broadcasting station by a receiver manufacturer, and information data corresponding to the middleware data is included in the transmitted broadcast data. Demultiplexer 113 separates the middleware data and its information data so the upgrade can be performed. The information data of the middleware data includes, for example, information on a manufacturer, a model, a version, and so on of the receiver, and data information such as a name, a size, and so on of the middleware data.

The data processor 120 collects and reconstructs the transmitted data according to diverse protocols. Currently, a generally used data transmission protocol is DSM-CC of MPEG2. For example, if data is transmitted using the DSM-CC protocol, the demultiplexer 113 collects the separated additional data and reconstructs the data according to the method according to the corresponding protocol to form semantic data, i.e., initially transferred data.

The video processor 114 decodes the video data in a specified method, processes the decoded video data into a certain format displayable through the display device 115, and outputs the processed data. The display device 115 is a device that displays the video signal, and can be an LCD, PDP, or a CRT, etc.

The audio processor 116 decodes the audio data in a specified method, and processes the decoded audio data to a certain format to be output through the speaker 117.

The flash memory 118 stores a middleware program that is the basic program that directly controls the hardware in the receiver and a boot loader program that starts the receiver. The flash memory 118 has space to record a middleware program of the previous version and a space to record a middleware program of a new version. The flash memory 118 can have spaces to store middleware programs of at least two versions.

Specifically, the controller 123 can determine whether the upgrade of the received middleware data is possible based on the received receiver information (i.e., information on the manufacturer, model and version of the receiver). If possible, the controller 123 performs the upgrade by recording the receiver information and the middleware data in the specified spaces of the flash memory 118.

The RAM 117 is a temporary storage device that temporarily stores the programs recorded in the flash memory 118 to enable the controller 123 to execute the programs. Also, the received upgrade data, i.e., the middleware data, is temporarily downloaded in the RAM 117 before the upgrade data is recorded in the flash memory 118.

The input unit 121 is a device to input user's manipulation commands, and includes a manipulation panel (not illustrated) having a plurality of manipulation buttons, and a sensor to receive the manipulation commands transmitted from a remote controller (not illustrated).

The controller 123 can control the whole operation of the receiver, and can control the execution of the programs recorded in the flash memory 118. Also, the controller 123 can check whether the upgrade is successful by driving the new middleware program upgraded in the flash memory 118. The checking whether the upgrade is successful is performed as described below in more detail.

First, the controller 123 checks the receiver information. The controller 123 determines whether the new middleware data is suitable to the receiver by checking the receiver information stored in the flash memory 118 using a check routine of the receiver information (i.e., information on the manufacturer, model and version of the receiver) in the new middleware data.

Whether to upgrade can be determined based on the received receiver information, as an operational incapability of the receiver may exist if the received receiver information does not match the received new middleware data.

Accordingly, the controller 123 can determine whether the new middleware program is suitable to the receiver by comparing and checking the receiver information stored in the flash memory 118 and the receiver information included in the check routine using the check routine of the new middleware program.

Second, the controller 123 checks the download function. The controller 123 checks the download function of the receiver that is initialized by the new middleware program. The controller 123 can check whether the download function is normal using the data received and separated through the tuner 111 and the demultiplexer 113 and its information data. Here, the additional data may be the middleware data or other diverse service data, and the information data can be the data information such as the name and the size of the middleware data.

Specifically, the controller 123 can determine whether the download function is normal by comparing and checking the receiver information (i.e., the name, the size, and so on of the middleware data) of the currently received and separated data, and the actual information on the name and the size of the actually downloaded data.

Accordingly, the controller 123 can determine the integrity of the new middleware program upgraded in the flash memory 118.

If any error occurs during the process of checking whether the upgrade is successful as described above, the controller 123 determines that the upgrade fails, and can perform a rebooting operation using the previous middleware program pre-stored in the flash memory 118.

If the power supply is abruptly turned off or the user turns off the power supply during the above-described upgrading process, the controller 123 can determine that this is an upgrade failure, and can perform the rebooting using the previous middleware program.

Consequently, in the case that the upgrade failure is determined after the new middleware data is upgraded, the controller 123 can then perform a stable upgrade by initializing the receiver using the previous middleware program.

FIG. 2 is a flowchart illustrating an upgrading process performed by a digital broadcast receiver according to FIG. 1. Referring to FIG. 2, the upgrading method according to the present general inventive concept will be explained in detail.

The manufacturer of the digital broadcast receiver provides new middleware data of the receiver to the broadcasting station, and the corresponding broadcasting station transmits the new middleware data and the new middleware data's respective information data by carrying them on the broadcast data.

The digital broadcast receiver receives the broadcast data from the broadcasting station through the tuner 111, and demodulates and decodes the received broadcast data through the channel decoder 112 (operation S211).

The channel-decoded broadcast data is separated into the video data, the audio data, and the additional data by the demultiplexer 113 (operation S213). The video data and the audio data are processed through the video processor 114 and the audio processor 115, respectively, and the processed video data and audio data are output to the outside through the display device 115 and the speaker 117, respectively.

The additional data processed through the data processor 120 is downloaded under the control of the controller 123. The additional data according to the present general inventive concept, for example, may include the middleware data and the information data corresponding to the middleware data. The information data may include the information on the manufacturer, model, version, and so on of the receiver, and data information on the name, size, and other relevant characteristics of the middleware data.

The controller 123 determines whether the received middleware data can be upgraded in the receiver based on the received receiver information such as the manufacture, model, version information, and so on (operation S215).

If it is determined that the received information corresponds to the receiver, the controller 123 downloads the middleware data, and records the downloaded middleware data in the flash memory 118. At this time, the receiver information can also be recorded in the flash memory 118 (operation S217).

In order to complete the upgrade, the previous middleware data can be pre-stored in a specified space of the flash memory 118, and the downloaded new middleware data can be recorded in another space thereof.

The controller 123 can then check whether the new middleware data is accurately recorded in the flash memory 118 by primarily checking the new middleware data downloaded in the RAM 119 and the new middleware data recorded in the flash memory 118 (operation S218).

If the new middleware data is accurately recorded in the flash memory 118, the controller 123 initializes the receiver with the new middleware data by executing a boot loader program (operation S219).

If the new middleware data is not accurately recorded in the flash memory 118, the controller 123 determines that the upgrade fails, and executes the previous middleware program pre-stored in the flash memory 118 (operation S235).

Thereafter, the controller 123 checks whether the upgrade of the receiver is successful (operation S230), and then determines whether the new middleware data is suitable using the receiver information (operation S231).

The controller 123 can then compare and check the receiver information in the middleware data and the receiver information recorded in the flash memory 118 using the check routine of the receiver information in the new middleware data. In accordance with the result of the checking, the controller determines the suitability of the new middleware data.

The controller 123 can then determine the integrity of the downloaded new middleware program (operation S233). That is, the controller 123 checks the download operation by comparing the received data information (i.e., the name, the size, and so on of the middleware data with the actually downloaded data information. Accordingly, the controller can determine the integrity of the downloaded new middleware program.

The controller 123 can then check whether the upgrade of the new middleware program has been successful. If any error occurs during the above-described checking process (operation S231 and operation S233), the controller 123 then determines that the upgrade fails (operation S235).

Also, if the power supply is abruptly turned off or the user turns off the power supply during the above-described middleware program upgrading process (operation S211 to operation S219) or the process of checking whether the upgrade is successful (operation S231 to operation S233), the controller 123 can then determine this to be an upgrade failure (operation S235).

If it is determined that the upgrade fails (operation S235), the controller 123 drives the previous middleware program pre-stored in the flash memory 118 by executing the boot loader program. Accordingly, the receiver is initialized through the previous middleware program.

Meanwhile, if no error occurs during the process of checking whether the upgrade is successful (operation S231 to operation S233), the controller 123 can determine that the upgrade is successful, and the receiver is initialized through the new middleware program to perform the following operation.

The controller 123 displays a guide message such as a gauge bar to the outside using an OSD/OSG screen with respect to the upgrading process (operation S211 to operation S219) and the process of checking whether the upgrade is successful (operation S231 to operation S233), and also with respect to the result of checking whether the upgrade is successful.

Consequently, the digital broadcast receiver can receive a middleware program in a more stable manner.

As described above, according to the present general inventive concept, the stabilization of the digital broadcast receiver can be achieved by checking whether the upgrade is successful after the upgrade is performed and by using the middleware data of the previous version if the upgrade fails.

Since the process of checking whether the upgrade is successful can include checking of an error occurring in the downloaded middleware data and also through checking of an error occurring in the receiver itself during the upgrading operation, a stable upgrade can be performed.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A digital broadcast receiver comprising:
a first memory portion to store an old middleware data;
a second memory portion to store a new middleware data;

a receiving unit to receive the new middleware data and respective information data, and storing the new middleware data in the second memory portion to perform an upgrade; and a controller unit to determine whether the upgrade is successful by executing a check routine in the new middleware data, the check routine to check whether the download was intact by using the information data, and the controller unit to execute a boot loader program with the old middleware data when the controller unit determines the download is not intact according to the check routine.

2. A receiver as recited in claim 1, wherein the check routine uses the information data to check compatibility with characteristics of the receiver.

3. A receiver as recited in claim 2, wherein the information data comprises manufacturer information of the receiver.

4. A receiver as recited in claim 2, wherein the information data comprises model information of the receiver.

5. A receiver as recited in claim 2, wherein the information data comprises version information of the receiver.

6. A receiver as recited in claim 1, wherein the information data comprises characteristics about the new middleware data.

7. A receiver as recited in claim 6, wherein the information data comprises size information of the new middleware.

8. A method of receiving a digital broadcast, comprising:
storing old middleware data in a first memory portion;
receiving new middleware data and respective information data to perform an upgrade;
storing the new middleware data in a second memory portion;
determining whether the upgrade is successful by executing a check routine in the new middleware data, the check routine to check whether the download was intact by using the information data; and
execute a boot loader program with the old middleware data when it is determined that the download is not intact according to the check routine.

9. A method as recited in claim 8, wherein the check routine uses the information data to check compatibility with the receiver.

10. A method as recited in claim 9, wherein the information data comprises manufacturer information of the receiver.

11. A method as recited in claim 9, wherein the information data comprises model information of the receiver.

12. A method as recited in claim 9, wherein the information data comprises version information of the receiver.

13. A method as recited in claim 8, wherein the information data comprises characteristics about the new middleware data.

14. A method as recited in claim 13, wherein the information data comprises size information of the new middleware.

* * * * *